United States Patent
Hardage et al.

[11] Patent Number: 6,098,782
[45] Date of Patent: Aug. 8, 2000

[54] ROTARY MANIPULATOR FOR CONVEYOR GOODS

[75] Inventors: Tim W. Hardage; Mike Rupert, both of Watkinsville; Mickey Poole, Nicholson; John T. Prior, Ila, all of Ga.

[73] Assignee: Campbell-Hardage, Inc., Athens, Ga.

[21] Appl. No.: 09/065,928

[22] Filed: Apr. 24, 1998

[51] Int. Cl.[7] ................................................. B65G 47/30
[52] U.S. Cl. ...................... 198/403; 198/406; 198/418.6
[58] Field of Search ................................... 198/402, 403, 198/406, 418.6, 432

[56] References Cited

U.S. PATENT DOCUMENTS

| | | |
|---|---|---|
| 2,564,027 | 8/1951 | Osgood . |
| 3,290,974 | 12/1966 | Rowlands . |
| 3,642,114 | 2/1972 | Crispe et al. . |
| 4,067,433 | 1/1978 | Phipps ................................. 198/404 X |
| 4,128,377 | 12/1978 | Bramati ............................... 198/403 X |
| 4,519,492 | 5/1985 | Focke ....................................... 198/408 |
| 4,846,336 | 7/1989 | Hoyland et al. ......................... 198/432 |
| 5,106,075 | 4/1992 | Wafford et al. ..................... 198/403 X |
| 5,287,953 | 2/1994 | Mims .................................. 198/399 X |
| 5,630,496 | 5/1997 | Mims .................................. 198/406 X |

Primary Examiner—James R. Bidwell
Attorney, Agent, or Firm—Richard C. Litman

[57] ABSTRACT

A rotary manipulator for conveyor goods comprises a generally cylindrical manipulator disposed between an input or feed conveyor and one or more output conveyors, with its axis parallel to the planes of the conveyors and normal to their direction of travel. The manipulator includes at least one flattened side, with a retaining lip extending along one edge thereof. Articles such as baked goods advance along the feed conveyor, where they are captured on the flat of the manipulator and momentarily retained by the retaining lip. The manipulator is rotated to drop the articles inverted on a lower output conveyor. The next row of articles from the feed conveyor passes upright over the rounded opposite side of the manipulator, which is substantially tangent to the feed conveyor and to an upper output conveyor. The upright and inverted articles are placed in registry with one another at a point downstream. The present invention may be used for inverting predetermined ratios of various articles and placing them in facing registry with one another, but is particularly useful in the baking industry for the making of sandwich type goods. Other embodiments allow the present manipulator to divide a flow of articles onto an upper and a lower output conveyor without inverting the articles, to align randomly positioned articles in a conveyor line, and to stack a series of articles on an intermittently moving output conveyor.

14 Claims, 10 Drawing Sheets

ROTARY MANIPULATOR FOR CONVEYOR GOODS

BACKGROUND OF THE INVENTION

1. Field of the Invention

The present invention relates generally to devices for material handling and processing, and more specifically to a rotary manipulator for handling goods being processed on a conveyor line.

The present manipulator has a rotational or pivoting axis lateral to the direction of travel of the conveyed goods, and includes at least one lateral flat therein for momentarily capturing conveyed goods therein, for inverting, stacking, and/or aligning the goods.

2. Description of the Related Art

Various conveyor and line processing systems have been developed over the years, for the continuous and/or mass production of various goods. This is particularly true in the food processing industry, where conveyors are used in the preparation and processing of foods at just about every step of the baking process.

However, certain baked goods (Moon Pies, tm; Oreos, tm; etc.) are formed of two cookie, cake, or biscuit portions sandwiching a filling material of some sort. For the sake of esthetics and symmetry, these types of goods are conventionally formed with the two baked portions facing away from one another, i.e., with the bottom one inverted relative to the top one. This inversion of one of the baked cake or cookie portions relative to the other, and the alignment of the two portions after inverting the lower portion, has continued to be a problem in the baking industry. While numerous devices have been developed in the past (as discussed further below), they generally have proven relatively cumbersome, unreliable, inconsistent, and/or costly to maintain.

Accordingly, a need will be seen for a manipulator for conveyor goods which is capable of inverting selected goods and positioning those inverted goods beneath non-inverted goods to provide a symmetrical sandwich. The present manipulator may also be used for other purposes, such as alignment of randomly positioned goods on a conveyor, and/or the stacking of goods on a conveyor. While the present manipulator is particularly well adapted for use in the manufacture of sandwich type baked goods, it will be seen that it is also adaptable to other food or non-food articles being processed using a conveyor system, as well. A discussion of the related art of which the present inventor is aware, and its differences and distinctions from the present invention, is provided below.

U.S. Pat. No. 2,564,027 issued on Aug. 14, 1951 to Rollin D. Osgood, titled "Sheet Handling Apparatus," describes a wheel having a plurality of spokes extending radially therefrom, with the spokes rotating between a plurality of conveyor belts which serve to deliver and remove sheet material from the wheel. The rotation of the spokes is between alternating belt members. Among other functions, the Osgood apparatus is adapted to invert every sheet which passes therethrough, rather than selective articles in a predetermined ratio, as in the present invention. The Osgood device is incapable of passing any of the sheets thereover without inversion, as the spokes of the device extend far above the surface of the feed conveyor, and incoming articles being conveyed on the feed conveyor cannot pass over the top of the spoked inverting wheel of the Osgood apparatus. In contrast, the upper surface of the present inverting device is generally tangent with the upper surface of at least the feed conveyor, and may allow a predetermined number or ratio of articles to pass thereover without inverting.

U.S. Pat. No. 3,290,974 issued on Dec. 13, 1966 to Tom Rowlands, titled "Manufacture Of Mouthpiece Cigarettes," describes a rotary wheel for flipping precut and unattached lengths of cigarette filters end for end, for positioning the more cleanly cut end outwardly during assembly with the cigarette. The device comprises a radially protruding finger which bears downwardly on the somewhat resilient filter material to provide a grip. The wheel rotates, to flip the filter element end for end. Clearance for the filter element is provided by a recess in the wheel when the filter is essentially standing vertically during the operation. The device does not transfer any goods from one conveyor to another, as provided by the present invention, and cannot be adapted for use in baked goods, due to the non-resilience and fragility of such goods. Moreover, the Rowlands device is disposed above the feed conveyor, rather than with its upper portion essentially tangent to the feed conveyor, as in the present device.

U.S. Pat. No. 3,642,114 issued on Feb. 15, 1972 to Stanley W. Crispe et al., titled "Biscuit Handling Machinery," describes a circumferentially slotted rotary wheel having a series of depressions formed about the circumference thereof, with the depressions having alternating depths with one another. A series of fingers or prongs fit within the slots of the wheel, extending substantially to the bottom of the shallower depressions but leaving a space between the prongs and the bottoms of the deeper depressions. Biscuits (cookies) are deposited in each of the depressions, with the prongs picking up those within the shallower depressions and depositing them on a first output conveyor, while passing over the biscuits within the deeper depressions. The biscuits of the deeper depressions continue around the wheel, being held in place within their respective depressions by a lower guard before being deposited inverted on a lower output conveyor. Thus, the Crispe apparatus actually rotates the conveyor goods about its periphery and requires a retaining guard, rather than capturing the first edge of an article and causing it to flip inverted and fall to the lower conveyor, as in the present invention. Moreover, the Crispe device would require modification in order to invert any other number of articles than every second one. The present manipulator comprises a single, unitary component, devoid of other components such as guards, pickup fingers or prongs, etc., and is easily adjusted to invert or stack any of a predetermined ratio of goods, merely by adjusting the rotational speed of the device. The present device may also be used as an alignment tool, unlike Crispe.

U.S. Pat. No. 4,067,433 issued on Jan. 10, 1978 to Robert E. Phipps, titled "Packaging Machinery," describes a generally U-shaped upright conveyor which collects upright articles at an entrance thereof and routes them around the U configuration to exit inverted. The inverted articles are then nested in a horizontal disposition with upright articles from another conveyor line. The Phipps device cannot select a limited number of articles from a predetermined ratio for inversion, as is possible with the present invention. Moreover, the Phipps device cannot stack or sandwich upright and inverted articles together, as provided by the present invention.

U.S. Pat. No. 4,519,492 issued on May 28, 1985 to Heinz Focke, titled "Method And Apparatus For Transporting Packs From A Feed Track To A Discharge-Conveyor Track,"

describes a double wheel configuration with the wheels having mutually orthogonal axes. The first wheel is relevant to the present invention, in that it tips the packages through 90 degrees about a lateral axis. However, no means is provided by Focke for completely inverting the goods, as provided by the present invention. Also, the Focke device acts on every article passing therethrough, and cannot bypass a predetermined ratio of articles to turn only every second, third, or some other ratio, as provided by the present inverting mechanism. Also, the Focke mechanism cannot act as a stacker, as provided by the present invention, but rather acts to "unstack" a previously serially stacked row of goods. Finally, the Focke device cannot serve as an alignment device, as can the present device.

U.S. Pat. No. 5,106,075 issued on Apr. 21, 1992 to Lawrence Wafford et al., titled "Fabric Turner," describes a pinch roller system in which one roller is disposed within the mouth of a slot having a generally bell-shaped cross sectional opening. Fabric falls downwardly into the slot, whereupon it is gripped within the lower portion of the slot to hold the upper portion in contact with the roller. The roller then transfers the fabric to the opposite side of the slot and rolls the sheet out of the slot to the opposite side, thus inverting the sheet. The device is not suitable for non-planar or relatively frangible or rigid goods, such as baked goods, and hence cannot be adapted for use with such. While the Wafford et al. device can stack two sheets atop one another, the stacking means cannot work with more than two sheets nor can it operate with relatively thick and rigid articles, such as baked goods.

U.S. Pat. No. 5,287,953 issued on Feb. 22, 1994 to Herman D. Mims, titled "Flip-Slide Apparatus," describes a system having an upper feed conveyor and a lower output conveyor. A generally triangular component is disposed therebetween. The triangular component can be made to oscillate back and forth, to serve as a guide to deflect articles (cookies) rearwardly beneath the edge of the upper conveyor, where they land inverted on the lower conveyor, or to serve as a slide to allow the articles to slide downwardly and land upright on the lower conveyor. No means is apparent for positioning the articles in registry or atop one another, as provided by the present rotary inverting device.

Finally, U.S. Pat. No. 5,630,496 issued on May 20, 1997 to Herman D. Mims, titled "Apparatus And Method For Flipping And Positioning Articles," describes an apparatus somewhat like the apparatus of the Mims '953 U.S. Patent discussed immediately above. However, the device of the '496 Mims U.S. Patent utilizes an inverted, generally V-shaped component to guide articles from the first conveyor, with the V-shaped guide being positionable between two different positions to guide articles to either an upright or inverted position on the lower belt. As the device cannot place the upright and inverted articles in registry with one another (i.e., with the upright articles atop the inverted articles), a relatively complex mechanism of selectively active retaining bars, retractable plates, and gates is used to position the upright and inverted articles in adjacent alternating rows. The present rotary manipulator accomplishes all of the above functions and more, through a relatively simple yet novel device.

None of the above inventions and patents, either singly or in combination, is seen to describe the instant invention as claimed.

SUMMARY OF THE INVENTION

The present invention comprises a rotary manipulator for conveyor goods, for selectively inverting a predetermined ratio of articles traveling along a conveyor system. The device is also capable of placing random rows of articles in registry, stacking articles atop one another, and placing upright articles in registry atop inverted articles.

The present manipulator device essentially comprises a generally cylindrical component having an axis of rotation parallel to the plane of the conveyor system, and normal to the direction of movement of the associated conveyors. The manipulator includes at least one generally flat surface thereon parallel to the rotational axis, with the surface including a lip or stop along one edge thereof. A feed conveyor delivers a plurality of articles to the manipulator, which is made to rotate at a circumferential velocity approximating that of the feed conveyor. Conveyed articles alternatingly pass onto the flat of the manipulator, where they are captured by the raised lip, and are rotated downwardly beneath a first output conveyor to a lower second output conveyor to land inverted on the second output conveyor. Another row or rows of articles pass over the rounded upper surface of the manipulator as it is rotated, to continue to the first or higher output conveyor in an upright disposition. The first output conveyor may be configured to drop the upright articles thereon, substantially in registry atop the inverted articles on the second output conveyor therebelow, thus forming a symmetrical sandwich of the goods.

The present manipulator may also be used to stack a series of articles vertically on the second output conveyor, by intermittently stopping the motion of the second output conveyor. Also, the present manipulator may be used to position randomly distributed articles from the feed conveyor in registry to form uniform rows, by oscillating the device to capture a series of articles on the flat surface and regularly releasing them.

Accordingly, it is a principal object of the invention to provide an improved rotary manipulator for conveyor goods for selectively inverting predetermined ratios of articles.

It is another object of the invention to provide an improved manipulator for conveyor goods comprising a generally cylindrical component having at least one flattened side including a retaining lip therealong, with the cylinder rotating about an axis parallel to the plane of the conveyors and normal to the direction of travel of the conveyors.

It is a further object of the invention to provide an improved manipulator for conveyor goods which in combination with an input or feed conveyor, an upper or first output conveyor, and a lower or second output conveyor, serves to position upright articles atop inverted articles in substantial registry with one another.

An additional object of the invention is to provide an improved manipulator which may serve to align randomly disposed articles from the input or feed conveyor.

Still another object of the invention is to provide an improved manipulator which may serve to stack articles atop one another on the second output conveyor.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a manipulator for use in conveyor systems, for inverting, dividing, aligning, and stacking various goods being processed by a conveyor system. While the present manipulator is particularly well adapted for use in handling baked goods, such as small cakes, cookies, etc., it will be seen that it is adaptable for use in handling innumerable other types of articles which are processed by a conveyor system at some point in the manufacturing and/or packaging process.

Figure 1:
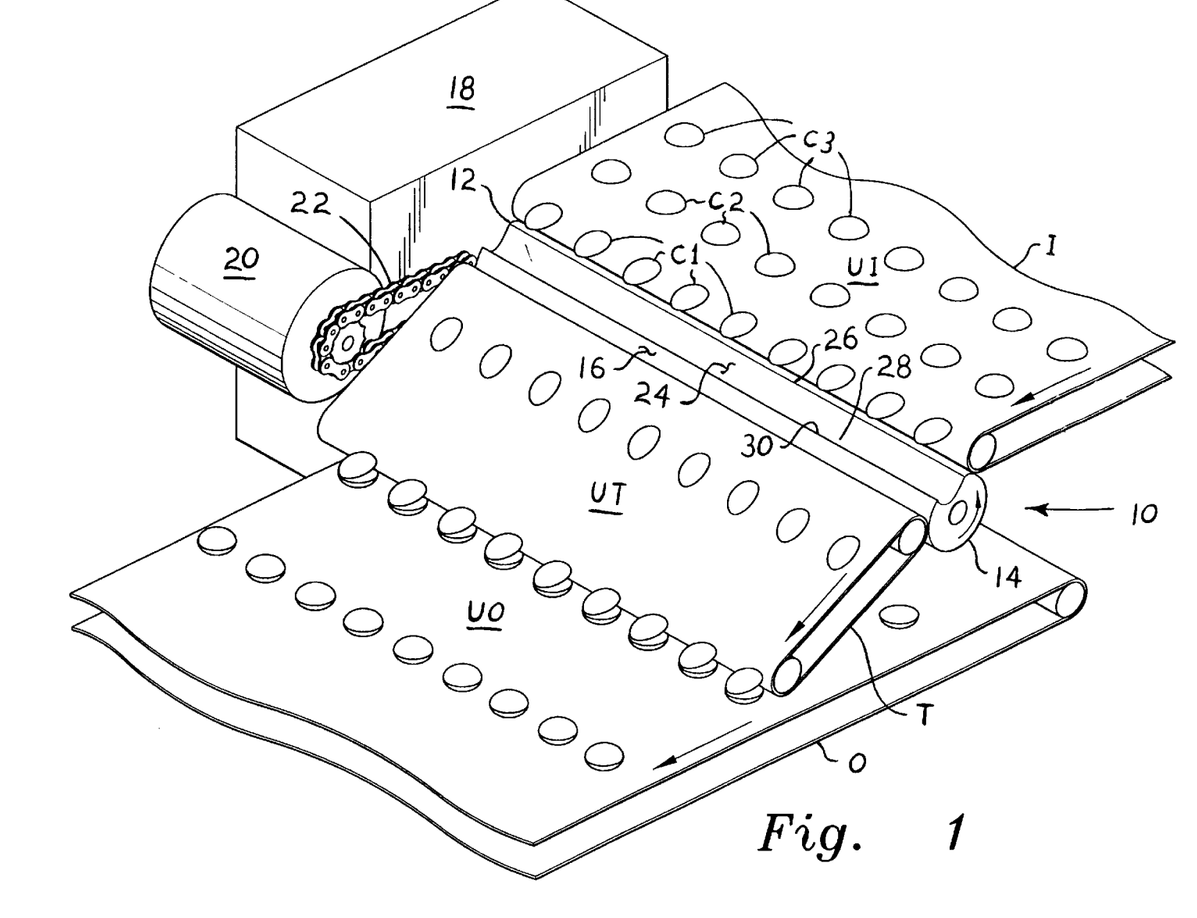
FIG. 1 is a broken away perspective view of a first embodiment of the present rotary manipulator, including a feed conveyor and upper and lower output conveyors, for inverting alternate articles and stacking inverted and upright articles.
Figure 2A:
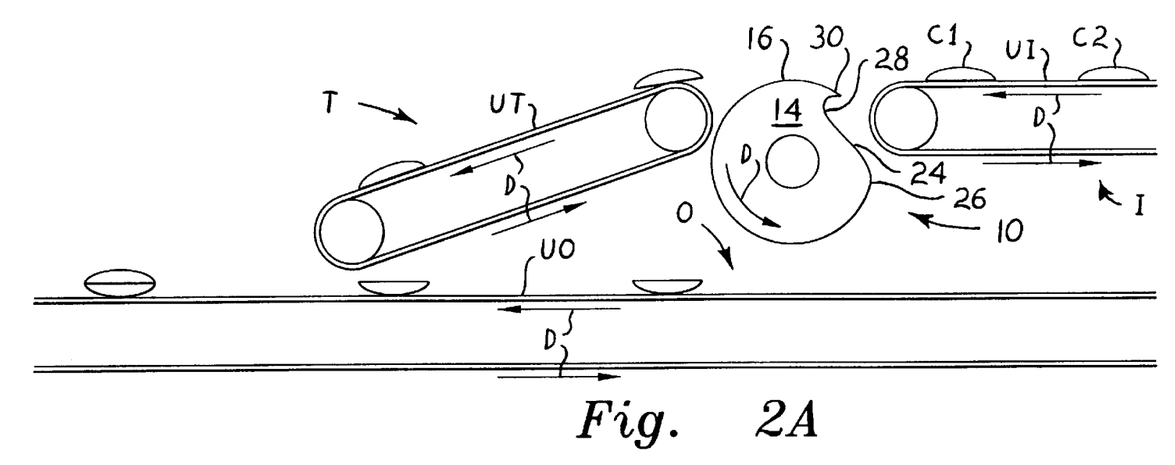
FIGS. 2A through 2D are schematic side elevation views of the embodiment of FIG. 2, showing the inverting and placing in registry process.
Figure 2B:
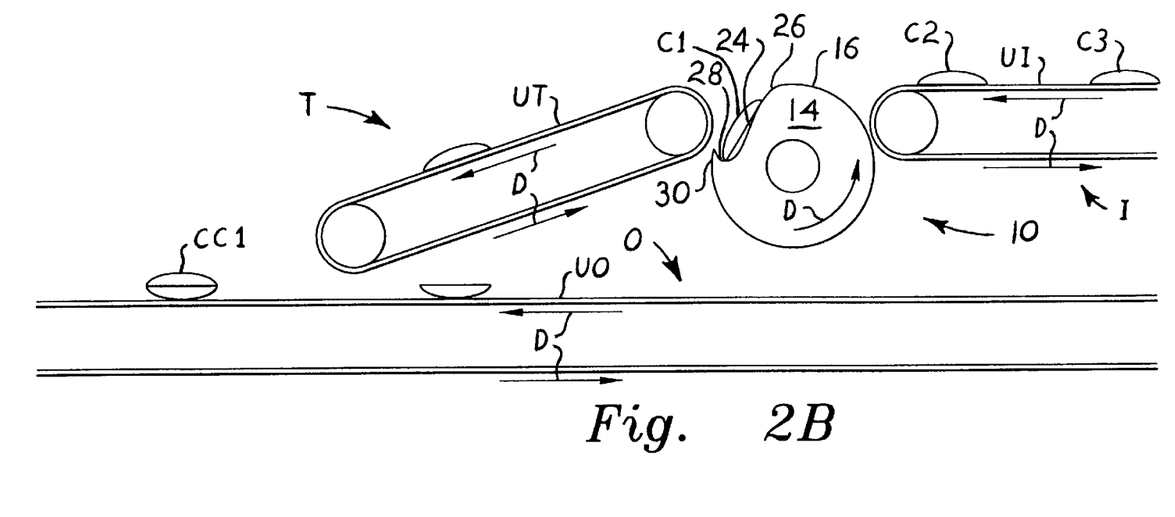
Figure 2C:
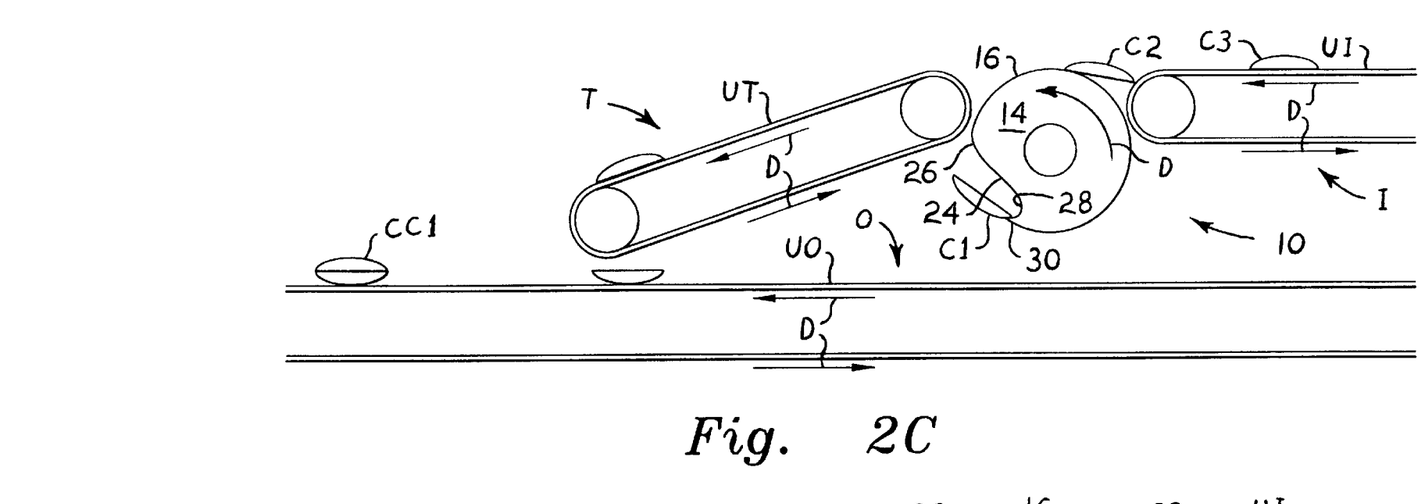
Figure 2D:
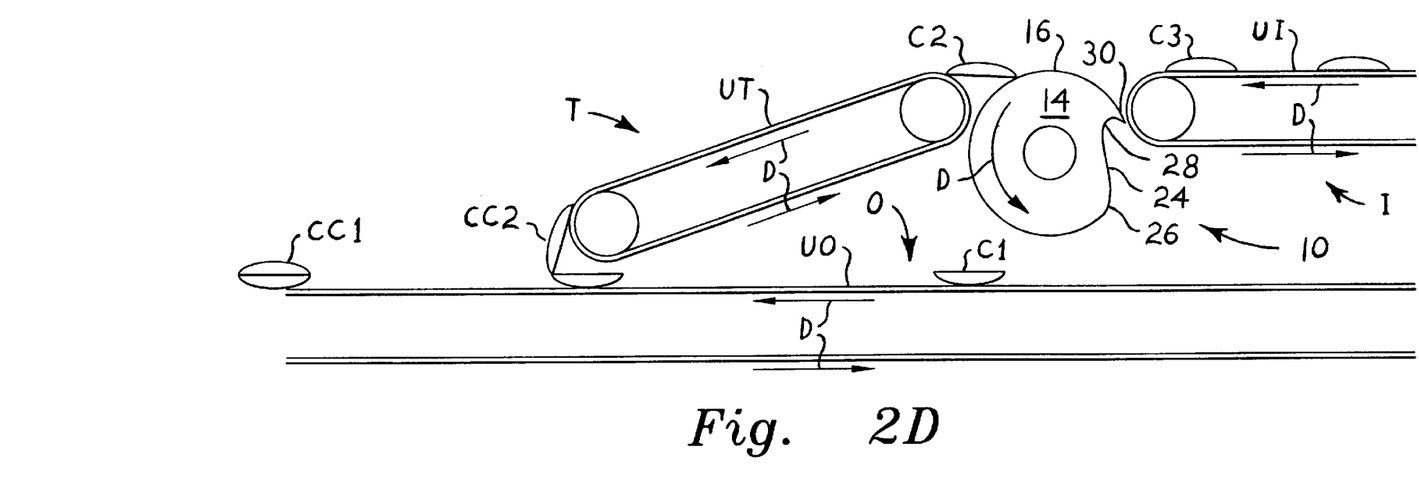

FIGS. 1 through 2D illustrate a first embodiment of the present manipulator, in which the device is installed in a conveyor line and provides for selectively inverting predetermined numbers or ratios of articles being delivered along the conveyor line. The manipulator essentially comprises a generally cylindrical roller 10 of unitary construction, with the roller 10 having a first end 12 and an opposite second end 14 to define a continuous length therebetween. The roller 10 has an outer circumference 16 which is preferably disposed in tangent with the upper surfaces or planes of the input or feed conveyor I and first or upper output or transfer conveyor T, respectively UI and UT, as shown in FIGS. 2A through 2D, and between the two conveyors I and T. (The support means for the conveyors U and T, as well as for the second or lower output conveyor O, and second end 14 of the manipulator roller 10, are conventional and are not shown in the drawing figures, for clarity in the drawings.)

It will be seen in FIGS. 1 through 2D that the manipulator roller 10 and the three conveyors I, T, and O each revolve or travel in the same direction, i.e., counterclockwise, as viewed in the drawing figures and indicated by the direction of travel arrows D. That is, the three conveyors each wrap around their respective support rollers in a counterclockwise direction, with their upper surfaces UI, UT, and UO moving from right to left in the drawing figures. The roller 10 revolves in the same direction as the conveyors I, T, and O, with its upwardly disposed surface moving from right to left at any one point in the operation of the present manipulator and system.

Preferably, the speed of rotation of the roller 10 is such that the outer circumference 16 travels at very close to, or perhaps slightly faster than, the speed of travel of the conveyors I, T, and O. The rotational speed of the roller 10 is controlled by conventional servo means 18 and driven by a motor 20 and chain drive 22 or other suitable drive means, as shown in FIG. 1. As an example, a cake or cookie processing conveyor may have a speed of 110 feet per minute, and it is desirable to rotate the roller 10 to achieve a similar (or perhaps slightly greater) outer circumferential speed. With a roller 10 having a diameter of five inches, or a circumference of slightly less than sixteen inches, a rotational speed of between 80 and 85 rpm would provide a close match. Obviously, different roller 10 diameters and/or different rates of travel of the conveyors I, T, and O, will require the rotational speed of the roller 10 to be adjusted accordingly.

The roller 10 includes at least a single flat 24 extending along the length of the roller 10, from the first end 12 to the second end 14. (In an alternative embodiment, the roller may include more than one flat therealong, such as the roller 10a of FIG. 7 with its two diametrically opposed flats 24a and 24b. Any practicable number of flats may be formed along a manipulator roller of the present invention, with the rotational speed of such a roller having plural flats being adjusted accordingly.) With articles on the conveyor being spaced about eight inches apart, it will be seen that two such articles in series will be processed for each revolution of the roller 10; other spacing is also possible.

The flat 24 includes a trailing edge 26 (i.e., the rearward edge of the flat 24, in the direction of rotation of the roller 10) which extends directly to the outer circumference 16 of the roller 10, and an opposite leading edge 28 including an upwardly or radially outwardly extending retaining lip 30 formed therealong, and extending from end to end of the roller 10. The flat 24 serves to accept articles from the input or feed conveyor I when the flat 24 is turned to a generally uppermost position, as shown in FIG. 1, capturing these articles on the flat 24 by means of the leading edge retaining lip 30. Thus, articles which slide from the input conveyor I to the flat 24, are momentarily precluded from sliding further in the direction of travel of the conveyors I, T, and O, and the direction of rotation of the manipulator roller 10, by means of the retaining lip 30 so long as the flat 24 is disposed to the general uppermost side of the roller 10.

FIGS. 2A through 2D provide a clearer disclosure of the complete operation of the present manipulator roller 10 and associated conveyors I, T, and O, for use in selectively inverting a predetermined number or ratio of articles or goods arriving from the input conveyor I. Beginning with FIG. 2A, first and second groups of articles (e.g., cakes or cookies, etc.) C1 and C2 are approaching the manipulator roller 10 along the input or feed conveyor I. (While the side elevation views of FIGS. 2A through 2D show only a single article in each C1 and C2 position, it will be understood that each article C1, C2, etc. may represent an entire row or group of such articles disposed laterally across a relatively wide conveyor, as shown in FIG. 1.) The flat 24 of the roller 10 is approximately 45 degrees ahead of its uppermost position, with a first article C1 approaching the end of the input conveyor I and a second article C2 following the first article C1.

FIG. 1 shows the next sequential point in the progression of the present selective inverting process, with the flat 24 of the roller 10 being positioned essentially level, or at the uppermost side of the roller 10, or slightly past that point. The first group of articles C1 has reached the delivery end of the input conveyor I, and is about to fall from the conveyor I onto the flat 24 of the roller 10. (The timing of the roller 10 may be slightly advanced to provide a slight downward slope for the flat 24 in the direction of travel of the articles being processed, in order to assist their falling onto the flat 24 and positive retention by the retaining lip 30.)

Returning to FIG. 2B, it will be seen that the manipulator roller 10 has rotated counterclockwise approximately 45 degrees from its position in FIG. 1, and 90 degrees from its position in FIG. 2A, so that the flat 24 is angled forwardly and downwardly approximately 45 degrees in the direction of travel of the articles C1, C2, etc. The first row or group of articles C1 has passed from the input conveyor I onto the flat 24 of the roller 10, where they are being momentarily retained on the roller 10 by means of the retaining lip 30 along the leading edge 28 of the flat 24. Simultaneously, the following row or group of articles C2 is approaching the output edge of the conveyor I, adjacent the roller 10.

In FIG. 2C, the manipulator roller 10 has rotated approximately 45 degrees further counterclockwise from its position of FIG. 2B, thus placing the flat 24 in a somewhat inverted position. As the flat 24 has no means of securing an article C thereto (other than the retaining lip 30, for preventing forward motion of an article C from the flat 24), any articles disposed upon the flat 24, e.g., the first group or row of cookies C1, will fall from the flat 24, with the forward edge of the article C1 being momentarily caught by the retaining lip 30 to cause the article C1 to flip inverted as it falls onto the output conveyor below the manipulator roller 10. Simultaneously, the following row or group of articles C2 has reached the end of the input conveyor I, and is being transferred to the manipulator roller 10.

As the roller 10 now has its rounded outer circumference 16 disposed upwardly and generally in tangent with the upper surface UI of the input conveyor I and upper surface UT of the transfer or upper output conveyor T, it will be seen that the articles C2 will be carried across the gap between the two conveyors I and T on the outer circumference 16 of the roller 10, as shown in FIG. 2D. As there is no flat 24 formed on this portion of the roller 10, no space exists between the roller 10 and the input edge of the transfer conveyor T, to allow any articles to pass therebetween. Thus, articles are transferred to the upper output or transfer conveyor T, rather than dropping downwardly to the lower output conveyor O.

It will also be seen that the relatively smooth transfer of articles from the input conveyor I, across the outer circumference 16 of the roller 10, to the upper output or transfer conveyor T, results in the articles remaining upright. Thus, articles traveling along the upper output conveyor T remain upright, while those which have been transferred to the lower output conveyor O are inverted, as shown in FIG. 2D.

The delay in forward motion of the first group of articles C1, due to their rotating downwardly about the rotation of the roller 10 and dropping onto the lower output conveyor O, also serves to place them substantially directly beneath the following second group of articles C2, as can be seen in FIG. 2D. As the inverted articles C1 travel along the lower output conveyor O beneath the upright articles C2 on the upper output conveyor T, they will meet at the output end of the upper output or transfer conveyor T to form a complete and symmetrical sandwich with the upper article being upright and the lower article being inverted, as indicated by the first sandwich CC1 at the extreme left side of FIG. 2D, and the second sandwich CC2 being formed at the output end of the transfer conveyor T in FIG. 2D. Meanwhile, third and fourth groups or rows of articles, respectively C3 and C4, are approaching the manipulator roller 10 along the input conveyor I, to continue the above described process.

It will be seen that the present manipulator roller 10 and the above described process with its input, upper output, and lower output conveyors, respectively I, T. and O, are particularly adapted for use in the food manufacturing and processing industry, for the manufacture of sandwich type goods such as Moon Pies (tm), Oreos (tm), etc. If sufficient room is provided between the upper output or transfer conveyor T and the lower output conveyor O, some means of applying filling to the inverted cake or cookie portions could be installed therein. Thus, as the inverted cake or cookie portion passes beneath the trailing or output edge of the upper output conveyor T to receive a corresponding upright cookie portion in registry thereatop, the entire sandwich manufacturing process would be completed with no additional steps required before packaging. It will also be seen that the present manipulator roller 10 may be adjusted to provide for the inversion of every third, fourth, or some other ratio of articles arriving on the input conveyor I, as desired according to the product being produced.

Figure 3:
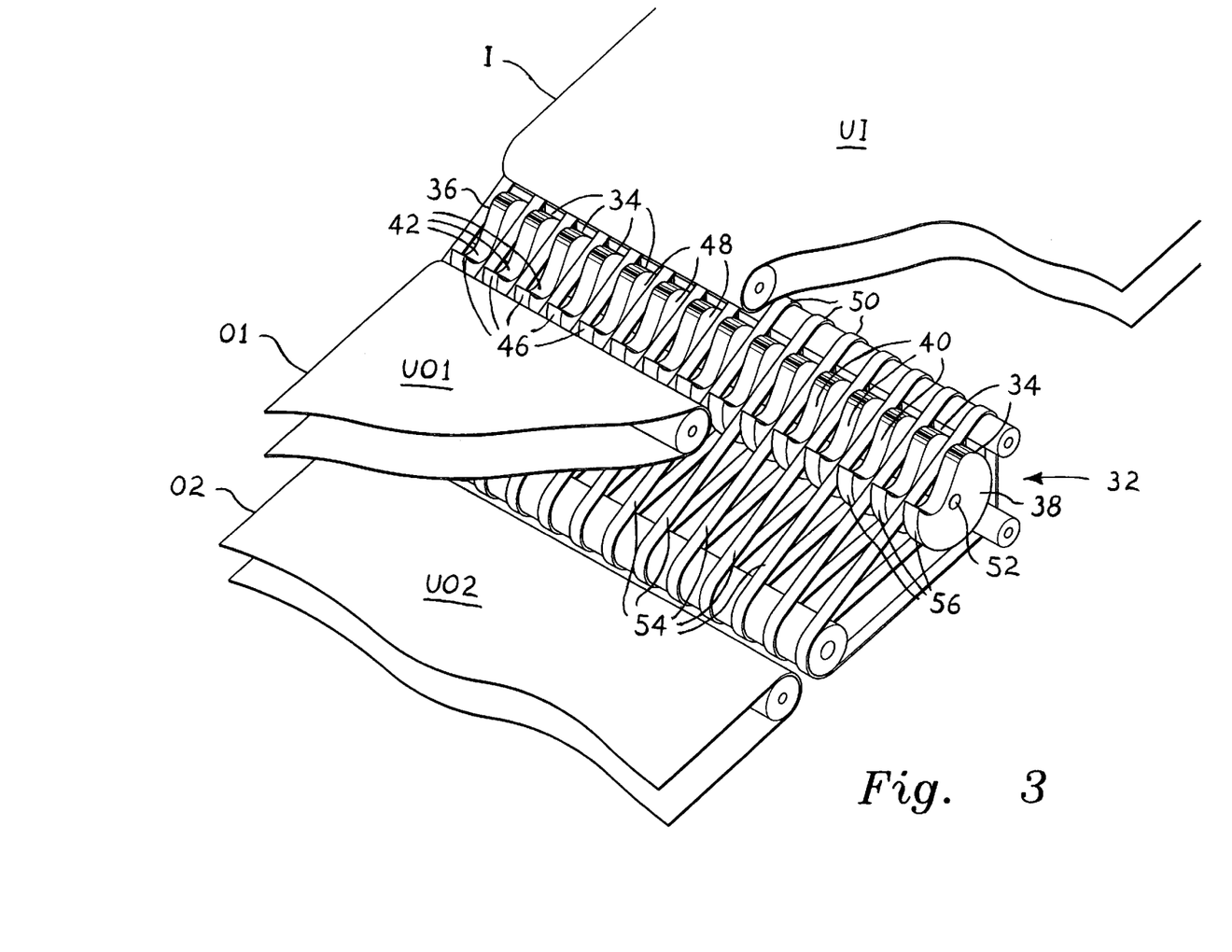
FIG. 3 is a second embodiment of the present invention, showing a segmented manipulator with a plurality of intermediate conveyor belts between the manipulator segments, for dividing articles from a single feed conveyor to two output conveyors.
Figure 4A:
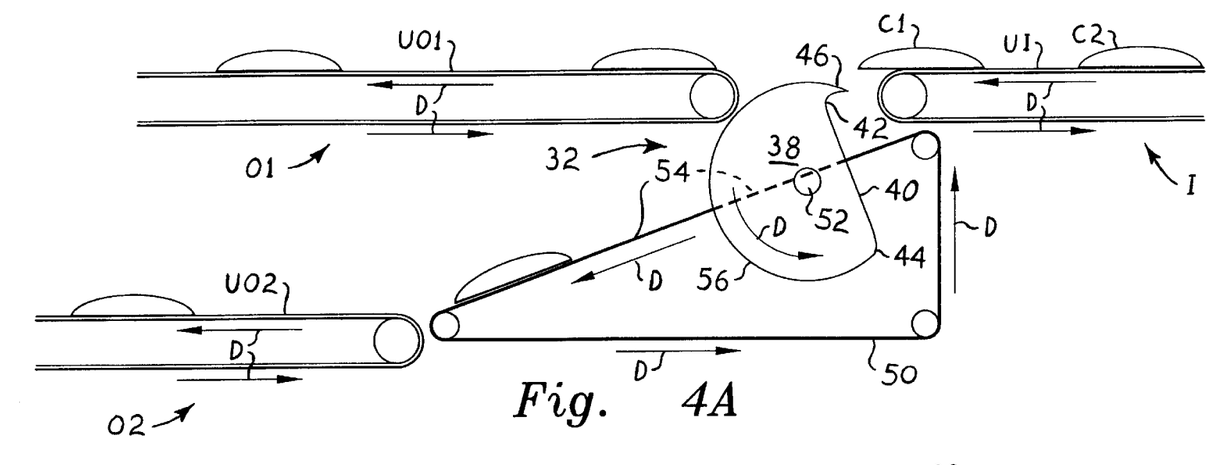
FIGS. 4A through 4D are schematic side elevation views of the embodiment of FIG. 3, showing the output dividing process.
Figure 4B:
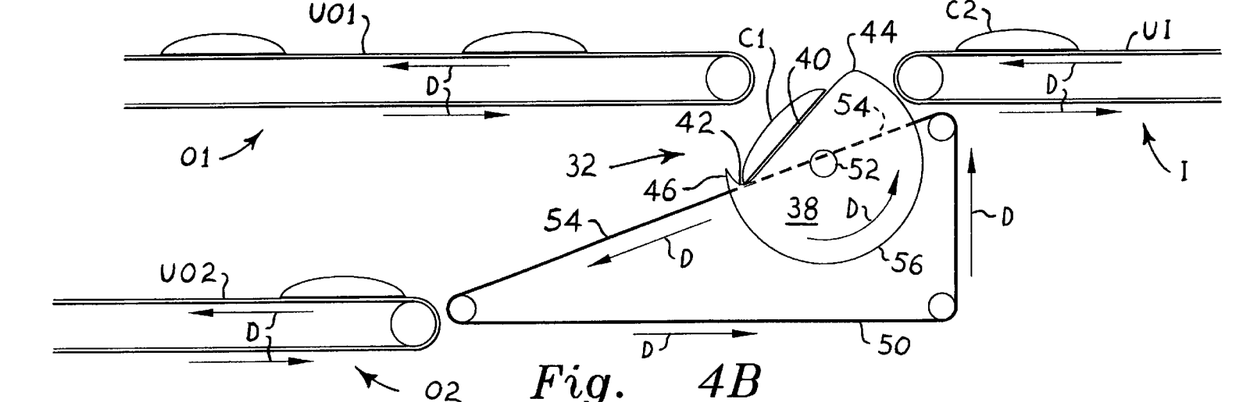
Figure 4C:
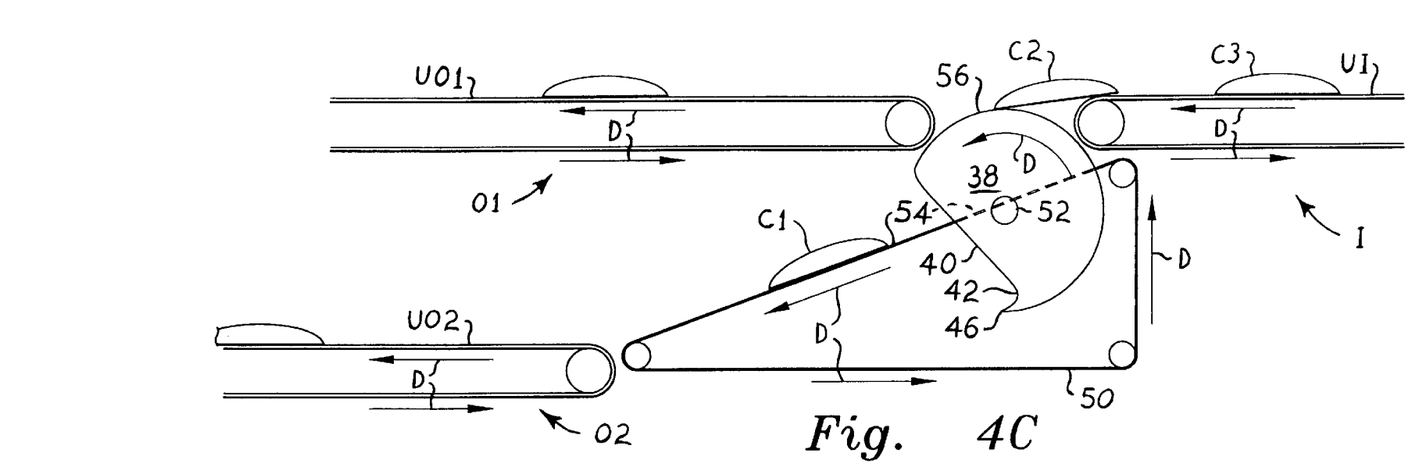
Figure 4D:
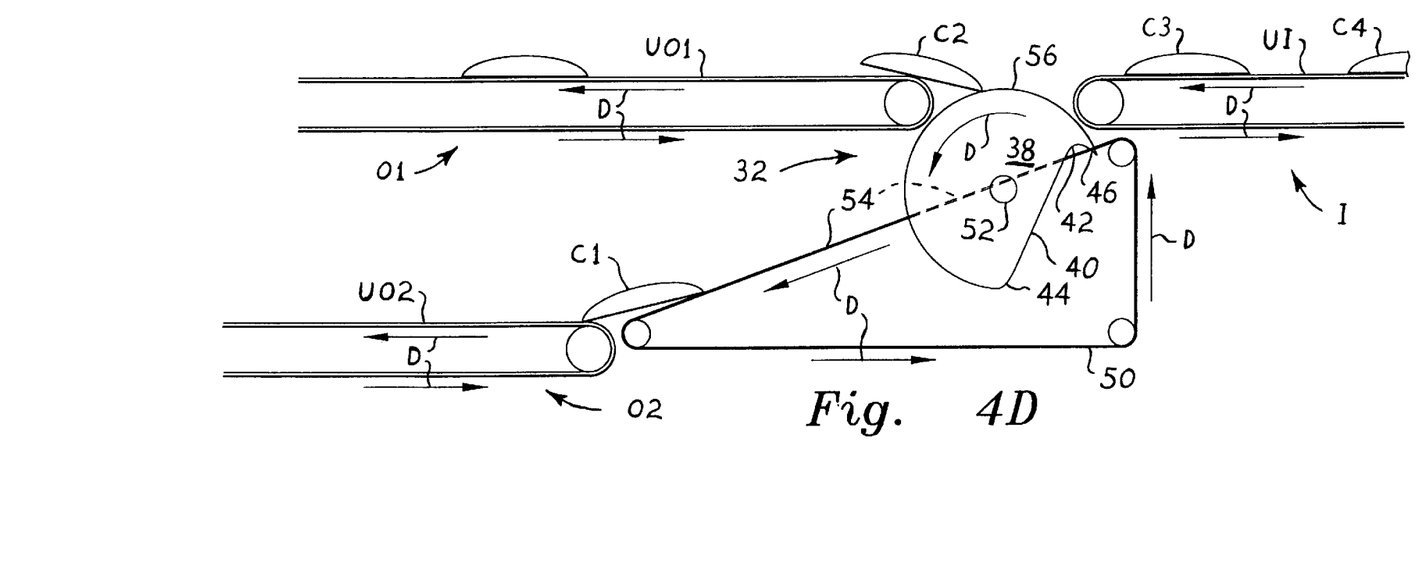

FIGS. 3 through 4D disclose an alternative embodiment of the above manipulator roller, for dividing articles between two output conveyors. The roller assembly 32 of FIGS. 3 through 4D has a generally cylindrical overall cross sectional shape substantially similar to that of the roller 10 of FIGS. 1 through 2D, but is divided into a series of diametric segments 34 along a common rotational axis between its first end 36 and opposite second end 38. Each segment 34 has at least one flat 40 formed thereacross, as in the flat 24 of the roller 10 of FIGS. 1 through 2D, with each of the flats 40 of the roller segments 34 being axially aligned with one another, i.e., lying in a single common plane.

Figure 7:
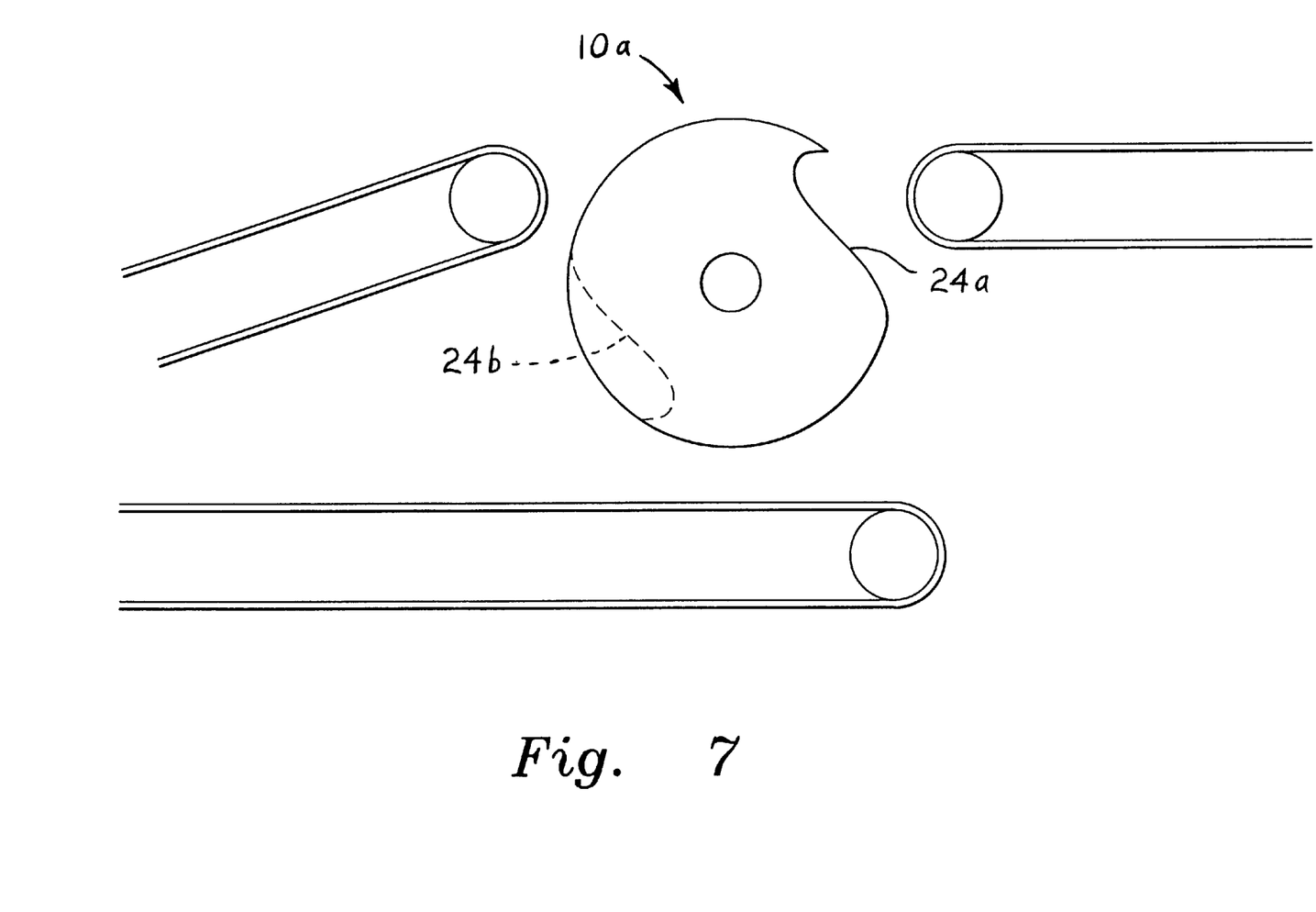
FIG. 7 is a schematic side elevation view of an alternative embodiment of the manipulator, incorporating two capture areas.

It will be seen that each of the roller segments 34 may have more than one flat formed therein, such as the two flats 24a and 24b formed in the manipulator roller 10a of FIG. 7, and discussed further above. All of the first flats are disposed in a common first plane, with all of the second flats being disposed in a common second plane, in such an embodiment.

Each flat 40 includes a leading edge 42 and an opposite trailing edge 44, with the leading edge 42 being to the left or counterclockwise from the trailing edge 44 as the roller assembly 32 rotates in a counterclockwise direction according to the exemplary embodiment of FIGS. 3 through 4D. Each leading edge 42 includes an article retaining lip 46 extending upwardly therefrom for momentarily capturing and retaining an article on the flats 40, in the manner of the flat 24 and retaining lip 30 of the roller 10 of FIGS. 1 through 2D.

Each of the roller segments 34 is separated from one another by a transfer conveyor belt passage 48 therebetween, with each passage 48 having a transfer conveyor belt 50 passing therethrough. The axis of rotation 52 of the segmented manipulator roller assembly 32 passes immediately beneath the upper runs 54 of the plural transfer belts 50, with the outer circumference 56 of each of the roller segments 34 extending upwardly above the upper runs 54 of the transfer belts 50, as shown in FIGS. 3 through 4D. However, the flats 40 are disposed only slightly above the upper runs 54 of the transfer belts 50 when the roller assembly 32 is rotated to position the flats 40 upwardly and substantially parallel to the upper runs 54 of the transfer belts 50.

The conveyor system of FIGS. 3 through 4D includes an input conveyor I and first or upper and second or lower output conveyors, respectively O1 and O2. The manipulator roller assembly 32 is positioned between the input conveyor I and the two output conveyors O1 and O2, with the outer circumference 56 of the roller assembly 32 being substantially tangent with the upper plane UI of the input conveyor I and upper plane UO1 of the upper output conveyor O1. The upper runs 54 of the transfer belts 50 extend from immediately below the downstream or delivery edge of the input conveyor I, to a point immediately adjacent the upstream edge and upper plane UO2 of the lower output conveyor O2, as shown in FIGS. 3 through 4A. The roller 32 and each of the conveyors I, O1, and O2, and 50, all rotate or travel in a common direction, as indicated by the directional arrows D of FIGS. 4A through 4D.

The conveyor apparatus and segmented roller assembly 32 of FIGS. 3 through 4D serve to divide a predetermined ratio of articles into two different groups to proceed along the upper and lower output conveyors O1 and O2. In FIG. 4A, the manipulator roller assembly 32 is rotated to a position where the flat 40 is just rotating into position at the delivery end of the input conveyor I, with an article (e.g., a cake or cookie C1) just reaching the delivery end of the input conveyor I. In FIG. 4B, each of the conveyors I, O1, O2, 50, and the roller assembly 32, have rotated somewhat farther in their direction of travel, with the input conveyor I having transferred the article C1 to the roller flats 40 and the roller assembly 32 being rotated approximately 90 degrees counterclockwise to tip the article C1 toward the upper run 54 of the transfer conveyor belts 50.

It will be seen that the position of the flats 40 slightly above the upper run 54 of the transfer belts 50, assures that an article being held by the flats 40 and retaining lips 46, cannot be lifted or carried from the flats 40 until the roller assembly 32 rotates counterclockwise sufficiently far to position the retaining lip 46 below the level of the upper run 54 of the transfer belts 50. As the angle of the flats 40 does not exceed more than about 45 degrees from the vertical before the retaining lips 46 are rotated below the upper run 54 of the transfer belts 50, the article C1 cannot be inverted as it is transferred from the flats 40 of the roller assembly 38 to the upper run 54 of the transfer belts 50, and remains upright throughout the transfer process.

In FIG. 4C, the article C1 has been completely transferred from the flats 40 of the roller assembly 32, to the upper run 54 of the transfer belts 50. As this occurs, the roller assembly 32 has rotated to position the outer circumference 56 in a position essentially bridging the gap between the input conveyor I and upper output conveyor O1, thus assuring that the next article C2 along the conveyor line will be transferred from the input conveyor I, across the outer circumference 56 of the roller assembly 32, to be received by the upper output conveyor O2, as shown in FIGS. 4C and 4D. Thus, every other article, i.e., odd numbered articles C1, C3, etc., will be deposited upright on the lower or second output conveyor O2, while alternating even numbered articles C2, C4, etc. are deposited on the upper output conveyor O1.

It will be seen that the timing of the belts, addition of further flats on the roller assembly 32, and/or spacing of the articles C1, C2, etc., may be adjusted in order to transfer every third or fourth article, etc., to one or the other of the output belts O1 or O2, as desired. While the servomotor and/or other drive means for rotating and regulating the rotational speed of the roller assembly 32 is not shown in FIGS. 3 through 4D, it will be understood that a similar mechanism to that shown in FIG. 1 may be used to operate the dividing system of FIGS. 3 through 4D. Also, while only a single article C1, C2, C3, and C4 is shown in FIGS. 4A through 4D, it will be understood that these articles may each represent an entire row or group of articles across a relatively wide conveyor belt system.

Figure 5:
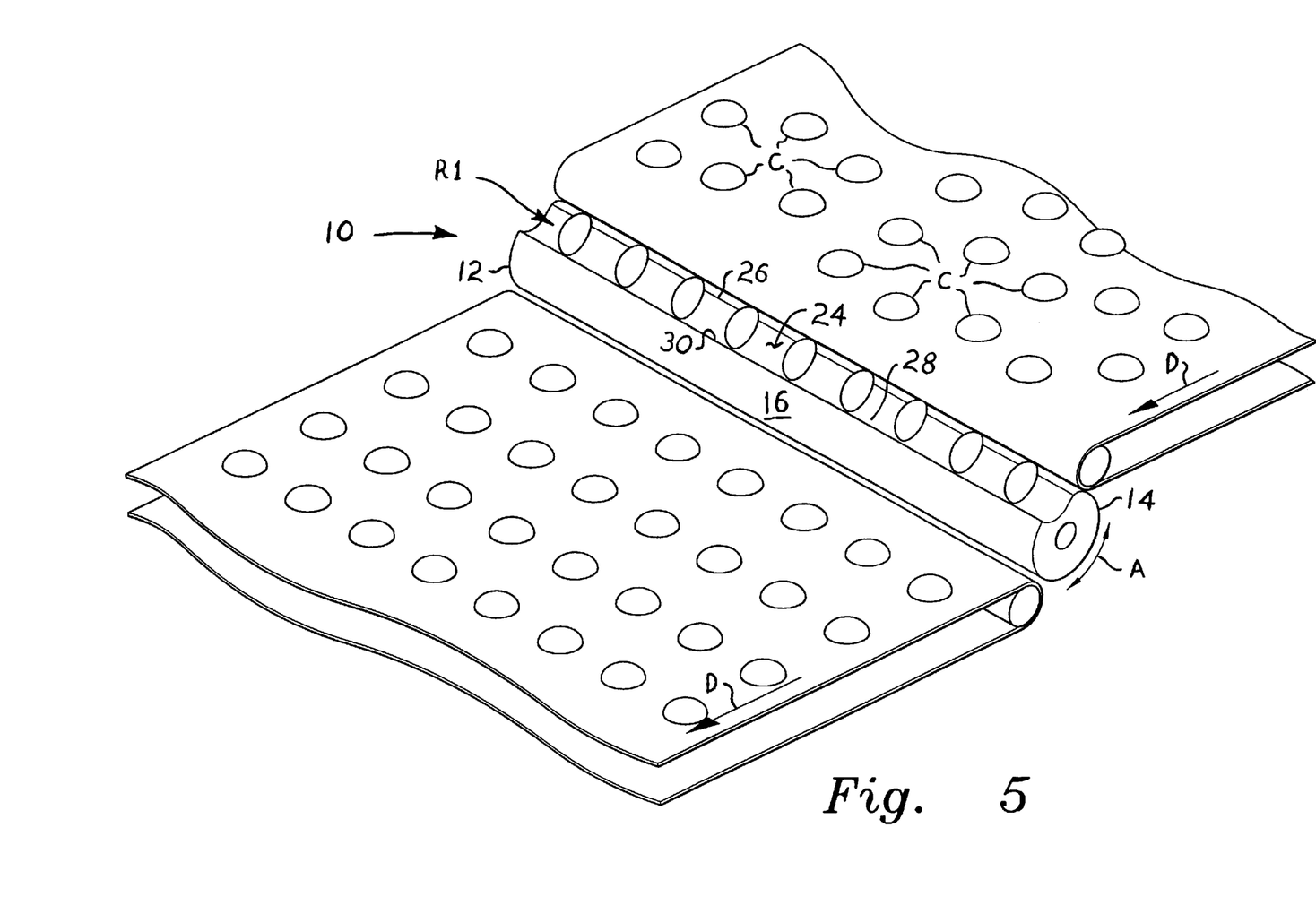
FIG. 5 is a broken away perspective view of a third embodiment of the present invention, wherein the manipulator is periodically oscillated to align randomly disposed articles from the feed conveyor.

FIG. 5 illustrates another embodiment of the present invention, wherein the roller is used as an aligning device between an input conveyor and an output conveyor. In FIG. 5, a unitary manipulator roller 10, essentially identical to the manipulator roller 10 of the embodiment of FIGS. 1 through 2D, is disposed between an input conveyor I and a single output conveyor O. The roller 10 includes a flat 24 extending from the first end 12 to the opposite second end 14, with the flat 24 having a trailing edge 26 and opposite leading edge 28 with an article retaining lip 30 extending along the leading edge 28 of the roller 10, from the first end 12 to the second end 14. The remainder of the generally cylindrical roller 10 is defined by an outer circumference 16, as described further above for the roller 10 of FIGS. 1 through 2D.

As in the conveyor and manipulator roller embodiments discussed further above, the input conveyor I has an upper surface or plane UI which is substantially tangent to the outer circumference 16 of the roller 10. However, the single output conveyor O is disposed below the plane UI of the input conveyor I, with the upper plane UO of the output conveyor O being disposed below the upper plane or surface UI of the input conveyor I. As in the other embodiments discussed above, the input and output conveyors I and O have the same direction of travel, i.e., with their upper surfaces UI and UO moving from right to left in FIG. 5, as indicated by the arrows D. The manipulator roller 10 also rotates periodically in the direction of travel of the conveyor upper surfaces UI and UO, but oscillates, for reasons discussed below.

The embodiment of FIG. 5 serves to align randomly positioned conveyor goods, from input conveyor I onto output conveyor O. This is done by oscillating the roller 10 to a position approximately as shown in FIG. 5, with the flat 24 being positioned upwardly for accepting goods being transferred from the input conveyor I. As the randomly positioned articles C travel along the input conveyor I toward the roller 10, they will be randomly gathered along the length of the roller flat 24 and retained thereon by the retaining lip 30 along the leading edge 28 of the flat 24. When a sufficient first group of goods have been captured and aligned along the flat 24 of the roller 10, as shown by the aligned row R1 on the roller flat 24, the roller 10 is rotated counterclockwise to a first end position to transfer the aligned row R1 to the adjacent edge of the output conveyor O. (Detection means, not shown, comprising conventional optical or tactile sensors, may be used to determine when a complete row R1 has been gathered along the roller flat 24.)

Once the roller 10 is oscillated counterclockwise through an arc A to transfer the group R1 to the output conveyor I, the roller 10 is oscillated back to a clockwise end position substantially as shown in FIG. 5 to receive another group of articles C and repeat the alignment and transfer process. It will be seen that this alignment process may also be achieved by intermittently advancing the roller 10 in the same direction of travel, with control by conventional servomotor means as described further above for other embodiments. Also, the roller may have a configuration as the roller 10a of FIG. 7, with a plurality of flats formed thereon.

FIGS. 6A through 6D illustrate yet another embodiment of the present manipulator roller and conveyor system, where the roller 10 serves as a stacking device for articles being transferred from the input conveyor I to the output conveyor O. In the embodiment of FIGS. 6A through 6D, the manipulator roller 10 is configured essentially identically as the rollers 10 of the embodiments of FIGS. 1 through 3D and 5, having a generally circular outer circumference 16, a flat 24 with a trailing edge 26 and opposite leading edge 28, with an article retaining lip 30 formed along the leading edge 28 of the roller 10. (Again, the roller may have the configuration of the roller 10a of FIG. 7, with a plurality of flats formed therein.) An input conveyor I feeds goods or articles to the manipulator roller 10, with the roller 10 being substantially tangent with the upper surface or plane UI of the input conveyor 10. An output conveyor O is provided to receive goods transferred from the roller 10, with the upper plane UO of the output conveyor being disposed somewhat below the roller 10.

In the embodiment of FIGS. 6A through 6D, the output conveyor O is periodically stopped to receive articles being transferred from the manipulator roller 10. Normally, the upper or input conveyor I and the roller 10 are in continuous motion, with their directions of travel or rotation being the same (e.g., counterclockwise, as indicated by the directional arrows D in FIGS. 6A through 6D). However, the output conveyor O is actuated only periodically, in the same direction of travel as the rotor 10 and input conveyor I.

Figure 6A:
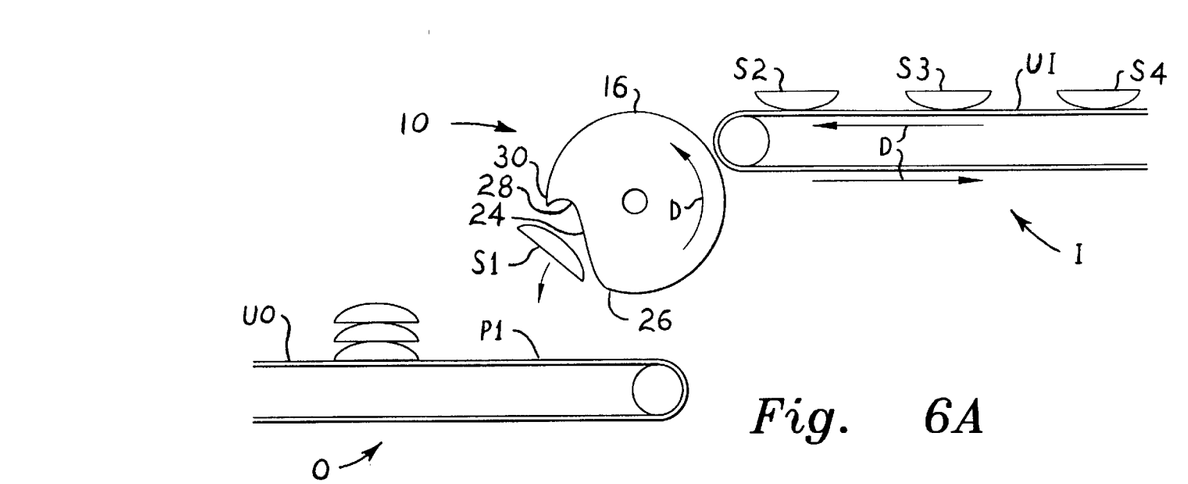
FIGS. 6A through 6D are schematic side elevation views of another embodiment of the present manipulator, in which the manipulator is used to stack articles on an intermittently operating output conveyor.
Figure 6B:
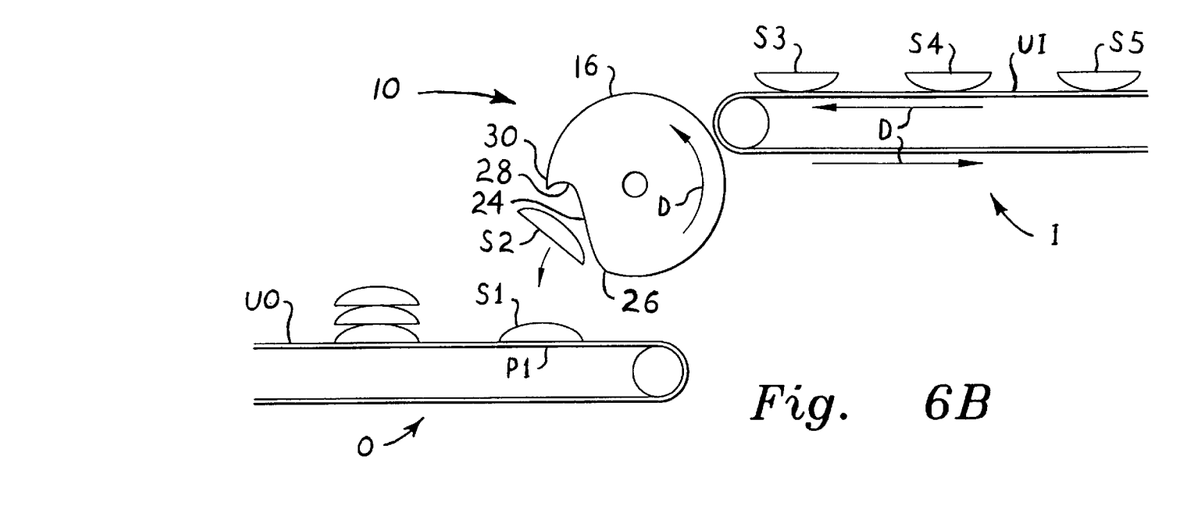

FIG. 6A illustrates a first position of the stacking embodiment, with a first stacked article S1 being dropped or transferred from the flat 24 of the roller 10 onto a stationary position P1 of the output conveyor O. (The height of the rotor 10 above the output conveyor O allows the stacked articles S1, S2, etc. to be flipped inverted as they are transferred from the roller 10 to the stationary output conveyor O.) In FIG. 6B, the input conveyor I has advanced to transfer the second stacking article S2 to the flat 24 of the roller 10, with the roller 10 continuing to rotate in a counterclockwise direction, as indicated by the directional arrow D, to transfer the second article S2 inverted atop the first article S1 at position P1 of the stationary output conveyor I. Simultaneously, subsequent stacking articles S3, S4, etc. are advanced toward the roller 10 along the continually moving input conveyor I, with the next article S3 about to be transferred from the end of the input conveyor I to the roller 10.

Figure 6C:
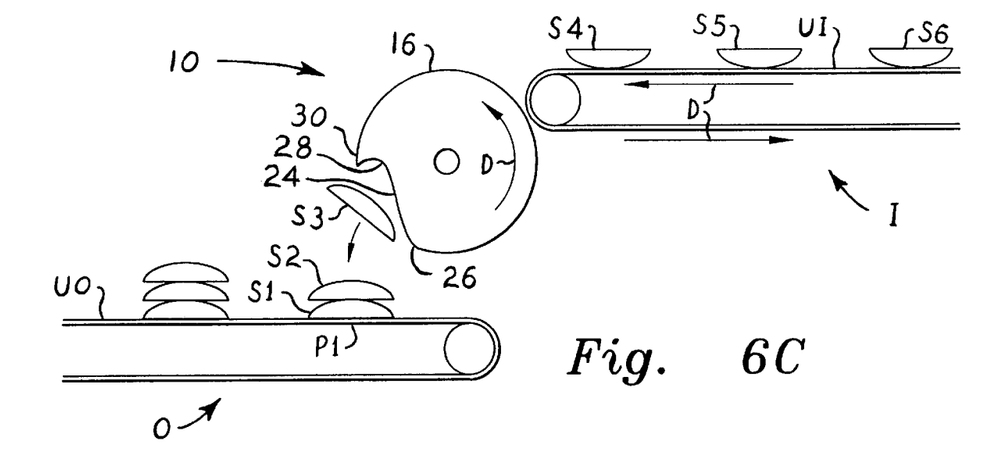

In FIG. 6C, the second stacking article S2 has been deposited atop the first stacking article S1 at the stationary first position P1 of the output conveyor O. A third stacking article S3 is being transferred from the flat 24 of the roller 10, downwardly toward the stack S1, S2 to complete the stack. Meanwhile, additional stacking articles S4, S5, and S6 are approaching the roller 10 along the input conveyor I, for subsequent stacking.

Figure 6D:
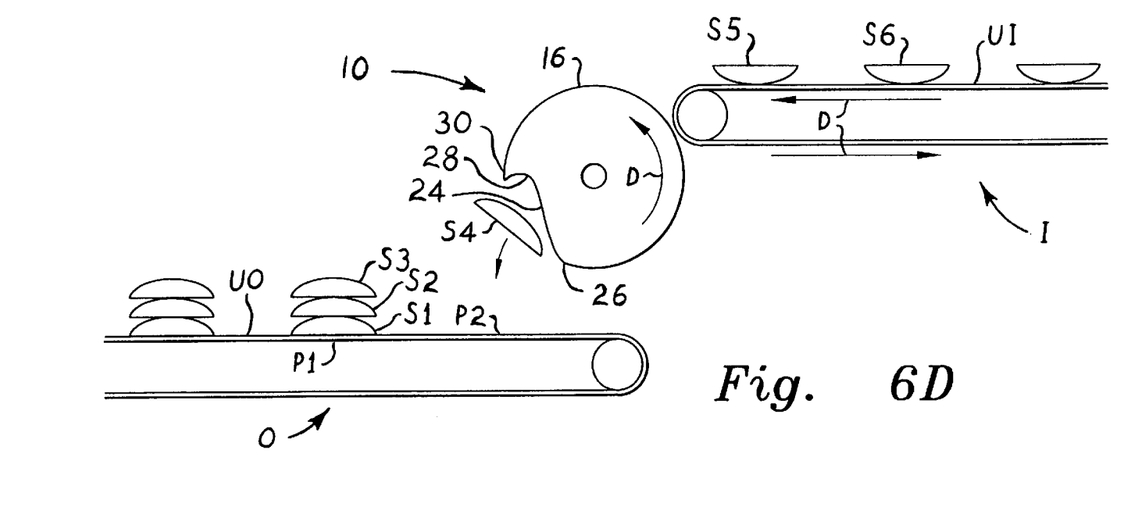

Finally, in FIG. 6D, the completed first stack S1, S2, S3 has been moved by advancing the output conveyor O, to place a second stacking position P2 beneath the downwardly angled flat 24 of the roller 10. A first stacking article S4, forming the bottom article in a new stack, is being transferred from the flat 24 of the roller 10 to the second stacking position P2 of the output conveyor O. Subsequent stacking articles S5 and S6 are approaching the roller 10 along the continuously advancing input conveyor I, to form the remainder of the second stack at the second position P2 of the output conveyor O, in the manner described above for forming the first stack at the first position P1 of the output conveyor O. It will be seen that guides or other means may be provided on the output conveyor O, if desired, in order to maintain such stacks of articles in closer registry with one another, and/or to permit higher stacks if so desired. The operation of the input conveyor I, roller 10, and intermittent operation of the output conveyor O, may all be governed by conventional means, such as the servomotor and control means 20 and 18 of FIG. 1.

In summary, the present invention provides several embodiments of a novel means for controlling or manipulating the passage of articles along a conveyor line. While the present invention is particularly well suited for the processing of solid food articles (cakes, cookies, etc.) in the food manufacturing or processing industry (particularly when formed of stainless steel or other suitable material), it will be seen that it is readily adaptable to handling and processing articles in many other industries as well.

While the inverting and symmetrical double stacking system of FIGS. 1 through 2d, the dividing system of FIGS. 3 through 4D, the aligning system of FIG. 5, and the multiple stacking system of FIGS. 6A through 6D have been discussed as separate components or assemblies in a conveyor processing line, it will be seen that they may be combined in different ways to provide multiple functions as required in a given conveyor line. For example, the inversion and symmetrical double stacking roller and conveyor assembly of FIGS. 1 through 2D, may be combined with the multiple stacking system of FIGS. 6A through 6D, to provide multiple stacks of the symmetrical sandwiches formed using the assembly of FIGS. 1 through 2D. This provides a significant advance in automation of such a system, with the resulting articles requiring only packaging to complete the process. Accordingly, the present manipulator roller in its various embodiments will be seen to provide a significant advance in conveyor processing, serving to make the entire process considerably more efficient than has been the case prior to the present invention.

It is to be understood that the present invention is not limited to the embodiments described above, but encompasses any and all embodiments within the scope of the following claims.

We claim:

1. In a conveyor system for processing conveyor goods and having an input conveyor, an upper output conveyor, and a lower output conveyor, with each conveyor defining a conveyor plane and direction of travel, a rotary manipulator for selectively inverting predetermined ratios of conveyor goods, comprising:

a unitary, generally cylindrical roller having a first end and an opposite second end defining a continuous length therebetween, and a direction of rotation the same as the direction of travel of each conveyor;

said roller having an outer circumference disposed substantially tangent with the planes of the input conveyor and upper output conveyor, with said roller being disposed between the input conveyor and upper output conveyor and above the lower output conveyor;

said roller including at least one flat formed thereon for selectively accepting a first group of the conveyor goods thereon from the input conveyor when said at least one flat is generally upwardly disposed during the rotation of said roller;

said at least one flat extending from said first end to said second end of said roller and including a leading edge and an opposite trailing edge;

said at least one flat including an upwardly extending retaining lip formed along said leading edge thereof for momentarily retaining the first group of the conveyor goods along said at least one flat as said roller rotates; and said retaining lip extending from said first end to said second end of said roller, with the first group of the conveyor goods falling from said at least one flat onto the lower output conveyor and flipping inverted by means of catching on said retaining lip of said at least one flat of said roller as said roller rotates to position said at least one flat generally downwardly, with said outer circumference of said roller passing a second upright group of the conveyor goods thereover from the input conveyor to the upper output conveyor as the first group of conveyor goods is inverted onto the lower output conveyor.

2. The manipulator according to claim 1, including an input conveyor, an upper output conveyor, and a lower output conveyor, with each said conveyor defining a conveyor plane and direction of travel and with said roller having a direction of rotation the same as said direction of travel of each said conveyor, with said outer circumference of said roller being disposed substantially tangent with said conveyor plane of said input conveyor and said upper output conveyor.

3. The manipulator according to claim 2, including drive means for said roller, said input conveyor, said upper output conveyor, and said lower output conveyor, for operating said roller and each said conveyor in registry with one another, with said outer circumference of said roller and each said conveyor having substantially equal velocities for placing each of the upright conveyor goods of the second group of conveyor goods substantially in registry atop a corresponding one of the inverted conveyor goods of the first group of conveyor goods.

4. The manipulator according to claim 1, wherein said at least one flat comprises a first flat and a second flat generally diametrically opposed from one another about said roller.

5. In a conveyor system for processing conveyor goods and having an input conveyor, an upper output conveyor, and a lower output conveyor, with each conveyor defining a conveyor plane and direction of travel, a rotary manipulator for selectively dividing predetermined ratios of conveyor goods between the upper output conveyor and the lower output conveyor, comprising:

a generally cylindrical roller assembly having a first end, an opposite second end, and a direction of rotation the same as the direction of travel of each conveyor;

said roller assembly comprising a plurality of segments disposed along a common axis of rotation, with each of said segments including a transfer conveyor belt passage therebetween;

said roller assembly having an outer circumference disposed substantially tangent with the planes of the input conveyor and upper output conveyor, with said roller assembly being disposed between the input conveyor and upper output conveyor and above the lower output conveyor;

each of said segments of said roller assembly including at least a first flat formed thereacross, with each said first flat of each of said segments being disposed in a single common plane and in axial alignment with one another, for selectively accepting a first group of the conveyor goods thereon from the input conveyor when said first flat is generally upwardly disposed during the rotation of said roller assembly;

each said first flat including a leading edge and an opposite trailing edge;

each said first flat including an upwardly extending retaining lip formed along said leading edge thereof for momentarily retaining the first group of the conveyor goods along said at least one flat as said roller rotates; and a transfer conveyor comprising a plurality of belts, with each of said belts passing through a transfer conveyor belt passage and between two of said segments of said roller assembly and extending from below the input conveyor to the lower output conveyor and below the upper output conveyor, with the first group of the conveyor goods passing upright from the input conveyor to said belts of said transfer conveyor and onto each said first flat of said roller assembly for further transfer along said transfer conveyor to the lower output conveyor, and with said outer circumference of said roller assembly passing a second upright group of the conveyor goods thereover from the input conveyor to the upper output conveyor as the first group of conveyor goods is transferred onto the lower output conveyor.

6. The manipulator according to claim 5, including an input conveyor, an upper output conveyor, and a lower output conveyor, with each said conveyor defining a conveyor plane and direction of travel and with said roller assembly having a direction of rotation the same as said direction of travel of each said conveyor, with said outer circumference of said roller assembly being disposed substantially tangent with said conveyor plane of said input conveyor and said upper output conveyor.

7. The manipulator according to claim 6, including drive means for said roller assembly, said input conveyor, said upper output conveyor, and said lower output conveyor, for operating said roller assembly and each said conveyor in registry with one another, with said outer circumference of said roller assembly and each said conveyor having substantially equal velocities.

8. The manipulator according to claim 5, wherein each of said segments of said roller assembly includes a first flat and a second flat generally diametrically opposed from one another about each said roller assembly, with each said first flat being aligned with one another and each said second flat being aligned with one another.

9. In a conveyor system for processing conveyor goods and having an input conveyor and an output conveyor, with each conveyor defining a conveyor plane and direction of travel, a rotary manipulator for processing conveyor goods between the input conveyor and the output conveyor, comprising:

a unitary, generally cylindrical roller having a first end and an opposite second end defining a continuous length therebetween, and at least a periodic direction of rotation the same as the direction of travel of each conveyor;

said roller having an outer circumference disposed substantially tangent with the plane of the input conveyor, with said roller being disposed between the input conveyor and output conveyor and above the output conveyor;

said roller including at least one flat formed thereon for selectively accepting a first group of the conveyor goods thereon from the input conveyor when said at least one flat is generally upwardly disposed during the rotation of said roller;

said at least one flat extending from said first end to said second end of said roller and including a leading edge and an opposite trailing edge;

said at least one flat including an upwardly extending retaining lip formed along said leading edge thereof for momentarily retaining the first group of the conveyor goods along said at least one flat as said roller rotates; and said retaining lip extending from said first end to said second end of said roller, with the first group of the conveyor goods sliding from said at least one flat onto the output conveyor as said roller rotates to tip said at least one flat to have a generally downward slope toward the output conveyor.

10. The manipulator according to claim 9, including an input conveyor and an output conveyor, with each said conveyor defining a conveyor plane and direction of travel and with said roller having a direction of rotation the same as said direction of travel of each said conveyor, with said outer circumference of said roller being disposed substantially tangent with said conveyor plane of said input conveyor and with said roller being disposed between said input conveyor and said output conveyor and above said output conveyor.

11. The manipulator according to claim 10, including drive means for said roller, said input conveyor, and said output conveyor, for operating said roller and each said conveyor in registry with one another, with said outer circumference of said roller and each said conveyor having substantially equal velocities.

12. The manipulator according to claim 10, wherein said roller oscillates through a rotary arc;

said arc having a first end position, with said at least one flat being generally horizontally disposed and adjacent said input conveyor for accepting randomly positioned conveyor goods from said input conveyor for aligning the conveyor goods along said retaining lip of said roller; and said arc having a second end position, with said at least one flat being downwardly sloped toward said output conveyor for transferring the conveyor goods aligned on said flat of said roller to a laterally aligned disposition on said output roller.

13. The manipulator according to claim 10, wherein said output conveyor is intermittently stationary and said roller and said input conveyor are in continuous motion, for stacking a plurality of conveyor goods atop one another upon said intermittently stationary output conveyor.

14. The manipulator according to claim 9, wherein said at least one flat comprises a first flat and a second flat generally diametrically opposed from one another about said roller.

* * * * *